United States Patent [19]

Auslander et al.

[11] Patent Number: 5,114,478

[45] Date of Patent: May 19, 1992

[54] HOMOGENOUS INK COMPOSITION

[75] Inventors: Judith Auslander, Westport, Conn.; Norman C. Hochwalt, West Carrollton, Ohio; Thjagaraj Sarada, Norwalk, Conn.

[73] Assignee: Pitney Bowes Inc., Stamford, Conn.

[21] Appl. No.: 637,713

[22] Filed: Jan. 7, 1991

[51] Int. Cl.$^5$ .............................................. C09D 11/02
[52] U.S. Cl. ...................................... 106/20; 106/21; 106/22; 106/30
[58] Field of Search ........................ 106/20, 21, 22, 30

[56] References Cited

U.S. PATENT DOCUMENTS

| | | | |
|---|---|---|---|
| 2,970,965 | 2/1961 | Switzer | 106/20 |
| 3,779,780 | 12/1973 | Dyson | 106/27 |
| 3,961,965 | 6/1976 | Zwahlen | 106/22 |
| 4,281,329 | 7/1981 | Yano et al. | 106/20 |

*Primary Examiner*—William R. Dixon, Jr.
*Assistant Examiner*—Helene Klemanski
*Attorney, Agent, or Firm*—Peter Vrahotes; Melvin J. Scolnick; David E. Pitchenik

[57] ABSTRACT

A homogeneous ink for use in postage meter inking systems. The homogeneous ink is formulated by dissolving a coloring material composed of fluorescent toner in a non-volatile solution blend consisting of low molecular weight, low viscosity, non ionic surfactants with alcohol or ester terminal groups having an HLB number varying from 8 to 15 and glycols. Viscosity modifiers can be used as thinners and thickeners. A surface tension modifier compatible to the system of the polyether-alkl/polymethylsiloxane copolymers type can be added in trace concentrations. The ink components of this invention are all hazard free, non-hygroscopic and do not adversely affect the materials of the inking system in which they are used.

6 Claims, No Drawings

HOMOGENOUS INK COMPOSITION

BACKGROUND OF THE INVENTION

Inks that are used in postage meters have certain requirements. The inks should present little or no health hazard to the user by being non-mutagenic, have low toxicity and not occasion skin and eye irritations. The resulting print should emit a fluorescence intensity, where appropriate, that is readily detectable by scanners and the quality of the resulting print must assure clear visual recognition of the meter serial number, the city of origin, the date and the value of the postage. The print should have good archival properties, such as high water and light fastness and abrasion resistance. Since most inks in the postage meter field are applied using porous foams and rubbers, the inks should be inert to the foam applicator without dissolving, swelling, causing excessive plasticization or plugging the pores of the foam structure. The ink should also be non-hygroscopic and have a long shelf life.

Because it is to be used in a postage meter, the ink must not dry or cure on the applicator, but must dry rapidly on the paper to prevent smudging. Proper viscosity of the ink is critical to its performance in both the imaging process (release from the foam) and in the printing process (ink/paper interaction) because it controls the ink flow through both the porous foam and through porous paper. The ink should not settle or show phase separation over a large range of temperature and humidity.

Unfortunately, the characteristics of inks are that the parameters of ink formulations tend to be antagonistic to one another, i.e., providing an ink formulation that is acceptable for one purpose results in problems arising in another area. For example, if any ink is formulated to be non-hygroscopic, it may cause swelling of the foam and rubber components with which it is used.

Current inks have been made by dispersing a fluorescent pigment or toner into non polar solvents of the mineral oil type. These dispersion inks have certain draw backs, such as in settling which is occasioned by the difference in specific gravity between the different coloring materials. This results in color separation and pore plugging of the dispensing foams. Another disadvantage is that dispersion inks have non-Newtonian viscosities which will affect print quality.

Dispersion inks also show a filtration effect through the life of the roller, or other porous applicator material, due to the particle size differences. This expresses itself in a sharp decrease in print intensity with increased number of prints.

It obviously would be advantageous to have a homogenous phase ink that is easy to formulate, has a better solvent/coloring material compatibility than the vehicle/pigment for the dispersion ink, a higher solution stability and better color.

SUMMARY OF THE INVENTION

Solution inks for use in postage meter inking systems have been formulated. These inks have superior solution stability, enhanced fluorescence, good flow properties through the inking system and are inert to the materials of the postage meter printing system. These inks are formulated by dissolving the coloring material composed of fluorescent toner, fluorescent dye in a polymer binder, in a non-volatile solution blend consisting of low molecular weight, low viscosity, non ionic surfactants with alcohol or ester terminal groups with an hydrophylic lipophilic balance HLB number varying from 3 to 15, preferably 4 to 13, and various glycols. Viscosity modifiers, used as thinners and thickeners, are from the polar solvents or non ionic surfactant groups. A surface tension modifier compatible to the system from the polyether-alkyl/polymethylsiloxane copolymers type is added in trace concentrations. The ink components of this invention are all hazard free.

DETAILED DESCRIPTION OF THE INVENTION

The inks used in high speed postage meters, i.e. speeds such as four articles per second, are used with a dual layer foam system with a metering top layer preferably made of polyethylene open pore from with tight pores, $\sim 10\mu$, and a reservoir layer made out of larger pore size material thus providing as chloroprene. The inks used with this inking system should consist of a homogenous phase with no differences in particle size or cause plugging. At the same time, these inks should have no interaction and do not cause dimensional changes in the inking materials with which they are used. The printing elements used with this system are made of polybutadieneacrylonitrile with large concentrations of plasticizers, such as dibutylphtalate. The inks do not swell or reduce the mechanical strength of the materials with which they are used. The inks used in these systems have the proper flow through the foam applicators such system for optimal inking and printing. The viscosity range of the inks can be 400 to 2000 cps but preferably 800 to 1100 cps, ambient. The inks will not dry in a thin film or in the open foam when exposed to low humidity, such as 8% RH, and high temperature, such as 50° C. in the open atmosphere and at the same time they are non hygroscopic when exposed at high humidity and high temperatures such as 29° C., 95% RH. The solvents used are completely non-toxic. The fluorescence signal of the machine print is in the range of 15 to 60 PMU for easy handling by automatic sorting machines.

Ink formulations, meeting the above requirements comprise 5–25% of a glycol with low vapor pressure (<1 mm ambient,) and high polarity (Hildebrand solubility parameter >9) such as tripropylene glycol, triethylene glycol and tetraethylene glycol, 15–35% of one or more low molecular weight non ionic surfactants with a molecular weight <2000, viscosity <100 cps and an HLB of 3–15, such as oleyl, lauryl, and tridecyl and decyl alcohol ethoxylates, and polyoxyethylene fatty esters with various numbers of ethoxyl groups, preferably 1–12% of a non ionic surfactant with a viscosity of >200 cps and with an HLB between 4 and 15 which acts as a thickener and emulsifier, such as ethoxylated nonylphenol with various numbers of ethoxyl, 3–5% non volatile, polar solvent having a viscosity of <10 cps, a boiling point >230° C. and being inert to rubber which acts as a thinner or viscosity modifier such as propylene carbonate, texanol and 0.1–0.3% silicone glycol copolymer additive for reduced tack properties and reduced surface tension. Such reduced surface tension is effective for wetting homogeneously metallic printing elements such a chrome plated metals. Fluorescent toners are added to the above that are a mixture of red and yellow fluorescent dyes and resins in the concentration of between 20 to 50%. The dye concentration used for toning, such as Solvent Red 49 and CI Solvent Violet 24, should be between 0.03 to 5% of the total composition. All percentages in the specification, including the claims, are in weight percent. The composition should also include less than 0.1% non fluorescent dye.

Examples of such formulation are as follows:

EXAMPLE 1

| Ingredients | Manufacturer | Approximate wt % not 100% |
|---|---|---|
| Triazine modified sulphonamide resin | Day Glow | 35.0 |
| C.I. Basic Red #1 Basonyl Red 482 | BASF | 1.0 |
| C.I. Basic Violet #11 Basonyl Red 560 | BASF | .2 |
| C.I. Solvent 135 Alberta Yellow | Day Glow | .3 |
| C.I. Solvent Yellow 60:1 Potomac Yellow | Day Glow | 1.0 |
| C.I. Solvent Violet 24 Orasol Violet RN | Ciba Geigy | .012 |
| Propylene Carbonate | Aldrich | 4.0 |
| Oleyl alcohol ethoxylate Ameroxol OE-5 and OE-10 | Amerochol | 24.3 |
| Polyoxyethylene fatty ester G2109 | ICI | 14 |
| Hexylene Glycol | Aldrich | 5 |
| Tridecyl alcohol ethoxylate Iconol TDA-3 | BASF | 10 |
| Tetraethylene glycol | Aldrich | 5 |

| Properties of The Final Ink | |
|---|---|
| Viscosity at 25° C. | 1000 ± 30 cps |
| Surface tension at 25° C. | 37 dynes/cm |
| Water absorption at 29° C., 95% RH (5 hrs) | 2% |
| Volume swell of polybutadiene acrylonitrile rubber at 70° C., 72 hrs. (ASTM 471-79) | 9.4% |
| PMU (phosphor meter units) of drawdown | 160 |
| Fluorescence Emission at excitation of 254 nm | 600 nm |
| PMU of printer print on STD PB envelope | 40 |
| CIE color parameters L*, a*, b* measured with ACS system are 63.46, 55.13, 27.65 respectively | |

EXAMPLE 2

Same toner and dyes as the first example

| Polyoxyethylene fatty ester G 2109 | ICI | 35 |
|---|---|---|
| TPG (Tripropyleneglycol) | Aldrich | 11 |
| TEEG (Tetraethyleneglycol) | " | 11 |
| PC | " | 4 |
| Igepal 530 | " | 3 |

| Properties of the Ink | |
|---|---|
| Viscosity at 25° C. | 1050 cps |
| Surface tension at 25° C. | 37 dynes/cm |
| Volume swell of rubber (same conditions and rubber as ex. 1) | 10 |
| Water absorption at 29° C., 95% RH after 5 hrs | 7% |
| Same fluorescence and color as ex. 1 | |
| Weight loss after 120 hrs at 60° C. | <3% |

EXAMPLE 3

Same formulation as 2

| Additional Silicone glycol | Dow Corning | .2% |
|---|---|---|
| Additive 57 | | |

All the properties are the same as ex. 2 but the surface tension is 30 dynes/cm.

EXAMPLE 4

| Polyester resin | Day Glow | 20% |
|---|---|---|
| C.I. Basic Red 1 (Basonyl Red 482) | BASF | 2.0 |
| C.I. Solvent 135 Alberta Yellow | Day Glow | .5% |
| C.I. Solvent Yellow 60:1 Potomac Yellow | Day Glow | 3.0 |
| C.I Solvent Red 49 Neptun Red 543 | BASF | .2 |
| PC Propyl. Carbonate | Aldrich | 4 |
| Polyoxyethylene fatty ester G 2109 | ICI | 26 |
| Tripropylene Glycol | Aldrich | 10 |
| Oleyl alcohol ethoxylate Ameroxol OE-5 | Amerochol | 22 |
| Nonylphenoxy polyethyleneoxy ethanol Igepal CO 210 | GAF | .5 |
| Igepal CO 530 | GAF | .5 |
| Block copolymer of polypropylene oxide and ethylene oxide Pluronic L-43 | BASF | 4 |
| Pluronic 17R4 | BASF | 4 |
| Tetronic 304 Tetra functional block copolymers of ethylene oxide polypropyleneoxide and ethylene diamine. | BASF | 4 |

| Ink properties | |
|---|---|
| Viscosity at 25° C. | 770 cps |
| Water absorption at 29° C., 95% RH after 18 hours | 10% |
| Viscosity at 25° C. | 1600 cps |
| Water absorption after 24 hours at 29° C., 95% RH | 16.4% |
| All the other properties are similar to the previous inks. | |

EXAMPLE 5

| Triazine formaldehyde modified with sulphonamide resin | Day Glow | 31.0 |
|---|---|---|
| C.I. Basic Red #1 Basonyl Red 482 | BASF | 1.5 |
| C.I. Solvent 135 Albert Yellow | Day Glow | .3 |
| C.I. Solvent Yellow 60:1 Potomac Yellow | Day Glow | 1.0 |
| C.I. Solvent Red 49 Neptune Red 543 | BASF | .2 |
| C.I. Solvent 24 Orasol RN | CIBA GEIGY | .012 |
| Propylene Carbonate | Aldrich | 4.0 |
| Oleyl alcohol ethoxylate Ameroxol OE-5 | Amerochol | 17.5 |
| Polyoxyethylene fatty ester | ICI | 25 |
| Decyl alcohol ethoxylate Synthrapol KB | ICI | 10 |
| Tripropylene glycol | Aldrich | 5 |
| Polyproplylene glycol Pluracol P 425 | BASF | 5 |

| Properties of the ink | |
|---|---|
| Viscosity at 25° C. | 770 cps |
| Water absorption after 20 hours at 29° C., 95% RH | 10% |

What is claimed is:

1. A homogeneous ink composition comprising: 5% to 25% glycol having a low vapor pressure of <1 mm Hg at ambient, a polarity expressed as Hildebrand solubility parameter>9, 15% to 35% non ionic surfactant with a viscosity<100 cps and an HLB between 3 and 15, 3% to 5% non volatile polar solvent having a viscosity of <10 cps, a boiling point>230° C. and being inert to rubber, 20% to 50% resin, 0.3% to 5% fluorescent dye and less than 0.1% non fluorescent dye.

2. The homogeneous ink composition of claim 1 wherein said resin is selected from triazine formaldehyde modified with aromatic sulphonamide and polyester.

3. The homogeneous ink composition of claim 1 including 1% to 12% of a second non ionic surfactant with a viscosity>200 cps and an HLB between 5 and 15, inclusive.

4. The homogeneous ink composition of claim 3 including 0.1% to 0.3% silicon glycol polymer.

5. The homogeneous ink composition of claim 4 including a viscosity modifier.

6. The homogeneous ink composition of claim 5 including a trace amount of a surface tension modifier.

* * * * *